United States Patent Office 2,843,607
Patented July 15, 1958

2,843,607
PROCESS OF PREPARING ESTERS

Marcel Servigne, Sceaux, and Etienne Szarvasi, Clichy, France, assignors to L'Air Liquide Societe Anonyme pour l'Etude et l'Exploitation des Procedes Georges Claude, Paris, France No Drawing. Application November 23, 1954
Serial No. 470,820

Claims priority, application France July 13, 1954

12 Claims. (Cl. 260—347.5)

The present invention is directed to a process of preparing esters according to which two starting materials are hydrogenated and esterified.

It is known to prepare an ester from an acid and an alcohol, also, to obtain the latter by hydrogenating a carbonyl derivative, such as an aldehyde or a ketone.

Further, it is known to prepare a saturated ester by starting from an unsaturated acid and an alcohol, either by hydrogenating the unsaturated acid to obtain the corresponding saturated acid, and thereafter esterifying the alcohol by means of the resultant saturated acid or, by first esterifying the unsaturated acid by means of the alcohol and thereafter hydrogenating the resultant unsaturated ester to obtain the saturated ester. As mentioned above, the alcohol used in these reactions can itself be obtained by hydrogenating a carbonyl derivative.

In these different cases, one or two hydrogenations and an esterification operation are successively carried out; a solvent is generally used in the hydrogenation operation and the intermediate products must be separated before being used in the succeeding reaction.

The process which is the object of the present invention is characterized in that there are simultaneously carried out at least one hydrogenation and one esterification, without separation of the intermediate products, one of the starting products serving as a hydrogenation solvent.

Indeed, applicants have discovered that it is possible to effect simultaneous hydrogenation and esterification of a carbonyl derivative and an acid, or of an unsaturated acid and an alcohol, or even of an unsaturated acid and a carbonyl derivative.

Stated differently, the principle of the present invention consists in preparing "in situ" one of the esterification reactants, or even both, and to separate out only the ester.

In most instances, one of the starting products is soluble in the other; more particularly, should the substance to be hydrogenated be soluble in the other starting compound, then, the latter functions simultaneously as hydrogenation solvent and esterification reagent.

The process according to the present invention greatly simplifies the known methods of preparing esters; it can advantageously be applied to the preparation of esters of the tetrahydrofuran series, namely, to produce esters of tetrahydrofuroic acid or those of tetrahydrofurfuryl alcohol.

In the first case, when employing one of the usual processes, it is necessary to first prepare the ester of pyromucic (furoic) acid and to hydrogenate it thereafter. This procedure has the inconvenience—common to all (known) classical esterifications—of requiring two operational phases. Moreover, the yields of the esters of pyromucic acid are generally low. The process according to the present invention overcomes these drawbacks.

In the second case, the invention enables the preparation of the esters of tetrahydrofurfuryl alcohol, which are valuable industrial solvents, by starting directly from furfural, which is a readily available industrial product.

The process, according to the invention, is not limited to the preparation of esters of the tetrahydrofuran series, but can also be successfully employed in the preparation of other esters, namely those of the aliphatic and aromatic series. Indeed, the process of the present invention has very wide application. It is applicable to the treatment of all organic as well as inorganic acids, and to all alcohols e. g. ethyl, propyl and heptyl alcohol, ketones and aldehydes. The process is particularly useful in all cases where there exists sufficient spread between the respective boiling points of the starting material and of the resultant product, respectively, to permit effective separation in a practical manner of the reaction product by distillation.

The procedure is as follows: the starting products are heated in a hydrogen atmosphere in an autoclave subjected to a rocking motion; the temperature is of the order of 110° C. and the duration of the operation is two hours. Raney nickel is preferably used as hydrogenation catalyst. It is advantageous to use additionally an esterification catalyst, for example, para toluene sulfonic acid.

When the reaction is ended, the Raney nickel is separated by filtration, and the reaction product is removed by distillation.

There are given below several examples of the application of the process according to the invention in the preparation of different esters which are useful as solvents, especially, as solvents of plastic materials, or as intermediates in the manufacture of organic chemicals; some of these esters are useful in perfume manufacture.

Example I n-Heptyl acetate is prepared starting from 114 gms. heptaldehyde (oenanthol), by hydrogenating the latter compound in 153 gms. acetic anhydride in the presence of 10 gms. Raney nickel and 0.5 gm. para toluene sulfonic acid.

Yield (based on the oenanthol) _____percent__  79
B. P.$_{17}$ _____° C__  82
$n_d^{18}$ _____ 1.419
$d_4^{19}$ _____ 0.8857
Saponification value:
    Calculated _____ 354
    By test_____ 362
C, percent:
    Calculated _____ 68.31
    By analysis_____ 68.34
H, percent:
    Calculated _____ 11.46
    By analysis_____ 11.58

Example II

Phenyl-3-propanol-acetate is prepared from 100 gms. cinnamic aldehyde by hydrogenation in 77 gms. acetic anhydride in the presence of 10 gms. Raney nickel and 0.5 gm. para toluene sulfonic acid.

Yield _____percent__  62
B. P.$_1$ _____° C__  87
$d_4^{27}$ _____ 1.0242
$n_d^{26}$ _____ 1.4945
Saponification value:
    Calculated _____ 304
    By test_____ 297

Example III

Tetrahydrofurfuryl acetate is prepared from 96 gms. furfural by hydrogenating it in 102 gms. acetic anhydride in the presence of 10 gms. Raney nickel and 0.5 gm. para toluene sulfonic acid.

Yield _____ 40% pure product.
B. P.$_{12}$ _____ 81° C.–83° C.
$d_4^{23}$ _____ 1.0770.
$n_d^{21}$ _____ 1.4403.
Saponification value:
    Calculated _____ 389.
    By test _____ 375.

*Example IV*

Ethyl tetrahydrofuroate is prepared from 50 gms. furoic acid by hydrogenating it in 230 cc. absolute ethyl alcohol in the presence of 10 gms. Raney nickel.

Yield _____percent__ 37
B. P.$_{11}$ _____° C__ 76
$d_4^{22}$ _____ 1.0763
$n_d^{20}$ _____ 1.4385
Saponification value:
    Calculated _____ 388
    By test _____ 372
C, percent:
    Calculated _____ 58.31
    By analysis _____ 58.16
H, percent:
    Calculated _____ 8.39
    By analysis _____ 8.36

*Example V*

Ethyl tetrahydrofuroate is prepared from 71 gms. furoic acid by hydrogenating it in 200 cc. acetaldehyde in the presence of 10 gms. Raney nickel and 0.5 gm. of para toluene sulfonic acid. Yield, 45%. (For the constants, see Example IV.)

*Example VI*

Propyl tetrahydrofuroate is prepared from 50 gms. furoic acid by hydrogenating it in 200 cc. propyl alcohol in the presence of 10 gms. Raney nickel.

Yield _____percent__ 52
B. P.$_{15}$ _____° C__ 95
$n_d^{18}$ _____ 1.4412
$d_4^{22}$ _____ 1.0528
Saponification value:
    Calculated _____ 354
    By test _____ 343
C, percent:
    Calculated _____ 60.73
    By analysis _____ 60.52
H, percent:
    Calculated _____ 8.91
    By analysis _____ 9.24

As far as applicants are aware, propyl tetrahydrofuroate is a novel compound, not heretofore disclosed in the literature. It is useful as a solvent and as an ingredient of perfumes.

*Example VII* n-Heptyl-tetrahydrofuroate is prepared by hydrogenating it from 71 gms. furoic acid in 100 cc. heptyl aldehyde (oenanthol) in the presence of 10 gms. Raney nickel.

Yield _____ 45% (pure product).
B. P.$_{.2}$ _____ 105–107° C.
$d_4^{15}$ _____ 0.992.
$n_d^{17}$ _____ 1.4502.
Saponification value:
    Calculated _____ 261.
    By test _____ 259.
C, percent:
    Calculated _____ 67.25.
    By analysis _____ 67.03.
H, percent:
    Calculated _____ 10.34.
    By analysis _____ 10.49.

As far as is known, n-heptyl-tetrahydrofuroate is likewise novel per se. It is useful as a solvent and as an ingredient of perfumes.

We claim:

1. Improvement in the process of preparing esters by reacting a compound selected from the group consisting of acetic anhydride and furoic acid with a compound selected from the group consisting of heptaldehyde, cinnamic aldehyde, furfural, acetaldehyde, ethyl alcohol, propyl alcohol, and heptyl alcohol, comprisig the steps of: simultaneously esterifying and hydrogenating the reactants in the same reaction stage by heating them together in the presence of hydrogen and a hydrogenation catalyst, and thereafter separating the desired ester product from the reaction mixture.

2. Process according to claim 1, wherein one of the esterifying reactants is soluble in the other.

3. Process of producing n-heptyl tetrahydrofuroate which comprises the steps of: reacting furoic acid and heptyl alcohol in a hydrogen atmosphere in the presence of a hydrogenation catalyst to produce esterification and hydrogenation of the reactants, and thereby form n-heptyl tetrahydrofuroate, and thereafter separating the latter compound from the reaction mixture.

4. The process which comprises reacting furoic acid and propyl alcohol in a hydrogen atmosphere in the presence of a hydrogenation catalyst to form propyl-tetrahydrofuroate, and thereafter separating the latter compound from the reaction mixture.

5. The process which comprises: heating together acetic anhydride and heptaldehyde in a hydrogen atmosphere in the presence of a hydrogenation catalyst to form n-heptyl acetate, and thereafter separating the latter compound from the reaction mixture.

6. The process of preparing an ester by reacting acetic ahydride and cinnamic aldehyde, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

7. The process of preparing an ester by reacting acetic anhydride and furfural, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

8. The process of preparing an ester by reacting acetic anhydride and acetaldehyde, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

9. The process of preparing an ester by reacting furoic acid and heptaldehyde, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

10. The process of preparing an ester by reacting furoic acid and cinnamic aldehyde, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

11. The process of preparing an ester by reacting furoic acid and furfural, which comprises the steps of: simultaneously esterifying and hydrogenating the reactants in the same reaction stage by heating them together in the presence of hydrogen and a hydrogenation catalyst, and thereafter separating the resultant ester product from the reaction mixture.

12. The process of preparing an ester by reacting furoic acid and acetaldehyde, which comprises the steps of: simultaneously esterifying and hydrogenating the reactants in the same reaction stage by heating them together in the presence of hydrogen and a hydrogenation catalyst, and thereafter separating the resultant ester product from the reatcion mixture.

References Cited in the file of this patent

UNITED STATES PATENTS

| | | |
|---|---|---|
| 1,158,217 | Hibbert | Oct. 26, 1915 |
| 2,234,615 | Alexander | Mar. 11, 1941 |
| 2,333,771 | Dickey et al. | Nov. 9, 1943 |
| 2,400,727 | Yale | May 21, 1946 |

FOREIGN PATENTS

| | | |
|---|---|---|
| 485,313 | Germany | Oct. 29, 1929 |

OTHER REFERENCES

Holmboe: Chem. Abst., vol. 46, p. 4815 (1952).

Dunlop et al.: "The Furans" (1953), pp. 3–824, Reinhold Pub. Corp., N. Y.